United States Patent
Guo et al.

(10) Patent No.: US 12,525,660 B2
(45) Date of Patent: Jan. 13, 2026

(54) BATTERY MODULE, ELECTRONIC DEVICE USING THE SAME, AND ASSEMBLY METHOD OF BATTERY MODULE

(71) Applicant: Ningde Amperex Technology Limited, Ningde (CN)

(72) Inventors: Feilong Guo, Dongguan (CN); Hao Zhang, Dongguan (CN)

(73) Assignee: Ningde Amperex Technology Limited, Fujian (CN)

( * ) Notice: Subject to any disclaimer, the term of this patent is extended or adjusted under 35 U.S.C. 154(b) by 890 days.

(21) Appl. No.: 17/709,804

(22) Filed: Mar. 31, 2022

(65) Prior Publication Data

US 2022/0416319 A1 Dec. 29, 2022

Related U.S. Application Data (63) Continuation of application No. PCT/CN2021/103253, filed on Jun. 29, 2021.

(51) Int. Cl.
*H01M 10/44* (2006.01)

(52) U.S. Cl.
CPC .................. *H01M 10/441* (2013.01)

(58) Field of Classification Search
CPC .................................. H01M 10/441
See application file for complete search history.

(56) References Cited

U.S. PATENT DOCUMENTS

| | | | |
|---|---|---|---|
| 6,094,033 A | 7/2000 | Ding et al. | |
| 2010/0321025 A1 | 12/2010 | Lin et al. | |
| 2011/0309799 A1 | 12/2011 | Firehammer | |
| 2013/0127423 A1 | 5/2013 | Liang et al. | |
| 2014/0042973 A1 | 2/2014 | Kawahara et al. | |
| 2014/0220418 A1 | 8/2014 | Hsiao | |
| 2020/0303732 A1* | 9/2020 | Waki | |
| 2020/0313223 A1 | 10/2020 | Roy et al. | |

FOREIGN PATENT DOCUMENTS

| | | | |
|---|---|---|---|
| CN | 103972595 A | | 8/2014 |
| CN | 104409779 A | | 3/2015 |
| CN | 106785110 A | | 5/2017 |
| CN | 109765497 A | | 5/2019 |
| CN | 110459825 A | * | 11/2019 |
| CN | 112103577 A | | 12/2020 |

(Continued)

OTHER PUBLICATIONS

Internal_resistance_of_cells_of_lithium_battery (Year: 2009).*

(Continued)

*Primary Examiner* — Niki Bakhtiari
*Assistant Examiner* — Lilian Alice Odom
(74) *Attorney, Agent, or Firm* — WHDA, LLP (57) ABSTRACT

A battery module includes n batteries, n≥3. The n batteries are stacked in a sequence along a thickness direction of the battery, and m is defined as a round number of n/2, and the first battery and the m-th battery satisfy at least one of the following conditions: a1: a capacity of the m-th battery is greater than that of the first battery; b1: under a same state of charge, an open circuit voltage of the m-th battery is less than that of the first battery; and c1: under a same state of charge, an AC impedance of the m-th battery is less than that of the first battery.

20 Claims, 6 Drawing Sheets

(56) References Cited

FOREIGN PATENT DOCUMENTS

| CN | 112151851 A | | 12/2020 |
|---|---|---|---|
| JP | 1999307135 | * | 11/1999 |
| JP | 2012138362 A | | 7/2012 |
| WO | WO2010016771 A1 | * | 2/2010 |

OTHER PUBLICATIONS

Zhang et al, A Study on the Open Circuit Voltage and State of Charge Characterization of High-Capacity Lithium-Ion Battery Under Different Temperature (Year: 2018).*
CN 110459825 A_Machine_Translation (Year: 2019).*
JP 1999307135_Machine_Translation (Year: 1999).*
Office Action dated Dec. 27, 2022, issued in counterpart CN Application No. 202180003016.6. (5 pages).
Office Action dated Apr. 22, 2023, issued in counterpart CN Application No. 202180003016.6. (5 pages).
Office Action dated Jun. 27, 2022, issued in counterpart CN Application No. 202180003016.6. (8 pages).
Extended (Supplementary) European Search Report dated Jun. 24, 2024, issued in counterpart EP Application No. 21867921.5. (3 pages).
International Search Report dated Mar. 16, 2022, issued in counterpart International application No. PCT/CN2021/103253. (4 pages).

* cited by examiner

| Detecting n batteries, n≥3, and recording at least one of the following three parameters of the n batteries: capacities of the batteries; open circuit voltages of the batteries under a same state of charge; and AC impedances of the batteries under a same state of charge | ~S1 |

| Stacking the n batteries along a thickness direction X of the battery to form a battery module, defining m as a round number of n/2, the first battery and the m-th battery satisfy at least one of the following conditions: *a1*: a capacity of the m-th battery is greater than that of the first battery; *b1*: under a same state of charge, an open circuit voltage of the m-th battery is less than that of the first battery; and *c1*: under a same state of charge, an AC impedance of the m-th battery is less than that of the first battery | ~S2 |

BATTERY MODULE, ELECTRONIC DEVICE USING THE SAME, AND ASSEMBLY METHOD OF BATTERY MODULE

CROSS REFERENCE TO RELATED APPLICATION

The present application is a continuation application of PCT international application PCT/CN2021/103253, filed on Jun. 29, 2021, the disclosure of which is hereby incorporated by reference in its entireties.

TECHNICAL FIELD

The present application relates to the battery technology field, and in particular to a battery module, an electronic device using the same, and an assembly method of a battery module.

BACKGROUND

With the increasingly prominent energy and environmental problems, new energy technologies, particularly lithium-ion batteries, have been widely used as important power units. However, due to the limitation of battery technology, the voltage and capacity of a single battery cannot satisfy the increasing demand for high capacity and power. Furthermore, in order to obtain larger capacity and higher power output, multiple batteries often need to be connected in series and in parallel to form a battery module. However, when the battery module is assembled, since the stacking positions of respective batteries are not the same and there are differences in initial values of the battery, inconsistencies often exist between different batteries, resulting in over charge and over discharge of some batteries, which will affect the performance and application of the battery module, and even lead to the damage of the battery module.

In view of the above situation, the existing solutions mainly include an active/passive balance function at a level of the battery module. However, the active/passive balance at the level of the battery module is often accompanied with the waste of energy and the increase of cost, particularly with an increase in the number of batteries in series and in parallel, processing and cost issues become more prominent. How to solve the above problems needs to be considered by those skilled in the art.

SUMMARY

In order to solve problems in the prior art, the present application provides a battery module with a better battery consistency.

The present application provides a battery module, including n batteries, n≥3. The n batteries are stacked in a sequence along a thickness direction of the battery, and m is defined as a round number of n/2, and the first battery and the m-th battery satisfy at least one of the following conditions: a1: a capacity of the m-th battery is greater than that of the first battery; b1: under a same state of charge, an open circuit voltage of the m-th battery is less than that of the first battery; and c1: under a same state of charge, an AC impedance of the m-th battery is less than that of the first battery.

Embodiments of the present application include the following technical effects: by making batteries at least at both ends of the battery module and at least one battery in the middle of the battery module satisfy at least one of the above conditions, the batteries with different stacking positions in the battery module have different initial states according to the above rule, so that the plurality of stacked batteries have better consistency in a subsequent charge and discharge process.

In some embodiments of the present application, under a same state of charge, the open circuit voltage of the m-th battery is less than that of the first battery. In some embodiments of the present application, the capacity of the m-th battery is greater than that of the first battery.

In some embodiments of the present application, p is defined as a round number of m/2, n≥5, and the first battery, the p-th battery and the m-th battery satisfy at least one of the following conditions: a2: a capacity of the p-th battery is greater than that of the first battery, and less than that of the m-th battery; b2: under a same state of charge, an open circuit voltage of the p-th battery is less than that of the first battery, and greater than that of the m-th battery; and c2: under a same state of charge, an AC impedance of the p-th battery is less than that of the first battery, and greater than that of the m-th battery.

In some embodiments of the present application, under a same state of charge, an open circuit voltage of the p-th battery is less than that of the first battery, and greater than that of the m-th battery. In some embodiments of the present application, a capacity of the p-th battery is greater than that of the first battery, and less than that that of the m-th battery.

Some embodiments of the present application include the following technical effects: by making batteries between at least one battery in the middle of the battery module and at least one battery at both ends of the battery module satisfy at least one of the above conditions, the batteries with different stacking positions in the battery module have different initial states according to the above rule, so that the plurality of stacked batteries have better consistency in a subsequent charge and discharge process.

In some embodiments of the present application, the first battery to the m-th battery satisfy at least one of the following conditions: a3: a capacity of the battery close to the m-th battery is greater than that of the battery away from the m-th battery; b3: under a same state of charge, an open circuit voltage of the battery close to the m-th battery is less than that of the battery away from the m-th battery; and c3: under a same state of charge, an AC impedance of the battery close to the m-th battery is less than that of the battery away from the m-th battery.

In some embodiments of the present application, under a same state of charge, an open circuit voltage of the battery close to the m-th battery is less than that of the battery away from the m-th battery. In some embodiments of the present application, a capacity of the battery close to the m-th battery is greater than that of the battery away from the m-th battery.

Some embodiments of the present application include the following technical effects: a plurality of stacked batteries from the first battery to the m-th battery are stacked in at least one of the above conditions, so that the batteries with different stacking positions in the battery module have different initial states according to the above rules, which makes the plurality of stacked batteries further have better consistency in the subsequent charging and discharging process. Through this gradient arrangement, the capacity of the stacked battery in the middle of the battery module is larger, and its open circuit voltage and AC impedance are lower, so that when the battery module is charged and discharged, the discharge rate and heat production of the battery in the middle are smaller, and the charging voltage is lower, and further, it is possible to significantly improve the problem of accelerating the performance degradation of the whole battery module due to the increase of internal battery temperature and over charge and over discharge.

In some embodiments of the present application, in the first battery to a s-th battery, a maximum capacity is $C_{max}$, a minimum capacity is $C_{min}$, $(C_{max}-C_{min})/C_{max} \leq 6\%$, wherein when s=2, n≥3; or when s=3, n≥7; or when s=4, n≥9.

Some embodiments of the present application include the following technical effects: s batteries can be classified to form a battery unit, the s batteries included in the battery unit are stacked adjacent to each other, and by controlling the capacity gap between the s batteries within 6%, the consistency of the s batteries is improved, and further, the overall consistency of the battery module can be improved.

In some embodiments of the present application, under a same state of charge, in the first battery to a s-th battery, a maximum open circuit voltage is $V_{max}$, a minimum open circuit voltage is $V_{min}$, $V_{max}-V_{min} \leq 10$ mV, wherein when s=2, n≥3; or when s=3, n≥7; or when s=4, n≥9.

Some embodiments of the present application include the following technical effects: s batteries can be classified to form a battery unit, the s batteries included in the battery unit are stacked adjacent to each other, and by controlling the open circuit voltage gap between the s batteries under the same state of charge within 10 mV, the consistency of the s batteries is improved, and further, the overall consistency of the battery module can be improved.

In some embodiments of the present application, under a same state of charge, in the first battery to a s-th battery, a maximum AC impedance is $R_{max}$, a minimum AC impedance is $R_{min}$, $(R_{max}-R_{min})/R_{max} \leq 25\%$, wherein when s=2, n≥3; or when s=3, n≥7; or when s=4, n≥9.

Some embodiments of the present application include the following technical effects: s batteries can be classified to form a battery unit, the s batteries included in the battery unit are stacked adjacent to each other, and by controlling the AC impedance gap between the s batteries under the same state of charge within 25%, the consistency of the s batteries is improved, and further, the overall consistency of the battery module can be improved.

In some embodiments of the present application, the state of charge is 25% to 80%. In some embodiments of the present application, the AC impedance of the battery is less than or equal to 20 mΩ.

In some embodiments of the present application, the battery includes a housing, and the housing is a soft package or a hard shell.

The present application further provides an electronic device, including the above-mentioned battery module. In some embodiments of the present application, the electronic device includes a plurality of battery modules arranged in a direction perpendicular to the thickness direction of the battery, and the plurality of battery modules are connected in series or in parallel.

The present application further provides an assembly method of a battery module, including the following steps:
 step S1: detecting n batteries, n≥3, and recording at least one of the following three parameters of then batteries: capacities of the batteries; open circuit voltages of the batteries under a same state of charge; and AC impedances of the batteries under a same state of charge.
 Step S2: stacking the n batteries along a thickness direction of the battery to form a battery module, defining m as a round number of n/2, wherein the first battery and the m-th battery satisfy at least one of the following conditions: a1: a capacity of the m-th battery is greater than that of the first battery; b1: under a same state of charge, an open circuit voltage of the m-th battery is less than that of the first battery; and c1: under a same state of charge, an AC impedance of the m-th battery is less than that of the first battery.

Compared with the prior art, in the battery module of the present application, by making the plurality of batteries between the battery in the middle of the battery module and at least one battery at an outer end satisfy at least one of the above conditions, the batteries with different stacking positions in the battery module have different initial states, so that the consistency of the plurality of stacked batteries is better. Through this gradient arrangement, the capacity of the stacked battery in the middle of the battery module is larger, and its open circuit voltage and AC impedance are lower, so that when the battery module is charged and discharged, the discharge rate and heat production of the battery in the middle are smaller, and the charging voltage is lower, and further, it is possible to significantly improve the problem of accelerating the performance degradation of the whole battery module due to the increase of internal battery temperature and over charge and over discharge.

REFERENCE NUMERALS OF MAIN ELEMENTS

Battery module 10
Battery unit 11
Battery 12
Housing 13
Electronic device 1
Load 101
Thickness direction X
Width direction Y
Length direction Z The following specific embodiments will further describe the present application in combination with the above drawings.

DETAILED DESCRIPTION

Hereinafter, referring to the accompanying drawings, the description for the contents of the present application will be more fully. Exemplary embodiments of the present application are shown in the accompanying drawings. However, the present application may be implemented in many different forms and should not be construed as limited to the exemplary embodiments set forth herein. These exemplary embodiments are provided to make the present application thorough and complete, and to fully convey the scope of the present application to those skilled in the art. Similar reference numerals denote the same or similar components.

The terms used herein are for the purpose of describing specific exemplary embodiments only and are not intended to limit the present application. As used herein, a singular form "a", "one" and "this" are intended to also include a plural form unless the context clearly indicates otherwise. In addition, when used herein, "include" and/or "comprise or include" and/or "have", integers, steps, operations, components and/or modules, but does not exclude the existence or addition of one or more other features, regions, integers, steps, operations, components, modules and/or groups thereof.

Unless otherwise defined, all terms (including technical and scientific terms) used herein have the same meaning as commonly understood by those skilled in the same art as the present application. In addition, unless explicitly defined herein, terms such as those defined in the general dictionary shall be interpreted as having meanings consistent with their meanings in the relevant technology and the contents of the present application, and will not be interpreted as idealized or too formal meanings.

Exemplary embodiments will be described hereinafter in conjunction with the accompanying drawings. It should be noted that the components depicted with reference to the drawings are not necessarily displayed in proportion. The same or similar components will be given the same or similar reference numerals or similar technical terms.

Hereinafter, the specific embodiments of the present application are described in further detail with reference to the accompanying drawings.

Figure 1:
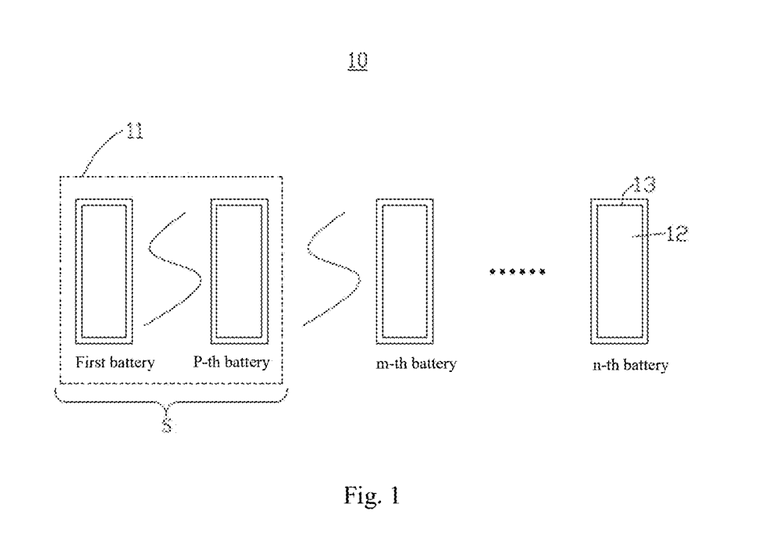
FIG. 1 is a schematic diagram of a battery module according to an embodiment of the present application.
Figure 2:
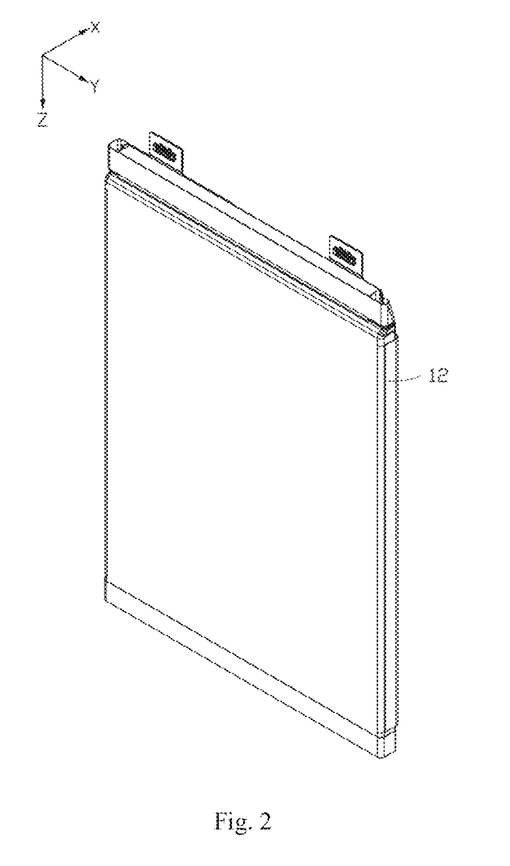
FIG. 2 is a schematic diagram of the structure and direction of a battery according to an embodiment of the present application.

As shown in FIGS. 1 and 2, the present application provides a battery module 10, including n batteries, n≥3, the n batteries 12 are stacked in a sequence along a thickness direction X of the battery 12. m is defined as a round number of n/2, and the first battery 12 and the m-th battery 12 satisfy at least one of the following conditions: a1: a capacity of the m-th battery 12 is greater than that of the first battery 12, b1: under a same state of charge, an open circuit voltage of the m-th battery 12 is less than that of the first battery 12, and c1: under a same state of charge, an AC impedance of the m-th battery 12 is less than that of the first battery 12.

Thereinto, n is a natural number (integer) greater than 0, that is, n represents the number of batteries 12 contained in a normal and complete battery module 10. The m-th battery 12 can be understood as the battery 12 in the middle of the arrangement of the n stacked batteries 12. Correspondingly, when n/2 is a non-integer, m is the integer obtained by rounding n/2.

In an embodiment, the first battery 12 and the m-th battery 12 of the battery module 10 at least satisfy: under a same state of charge, the open circuit voltage of the m-th battery 12 is less than that of the first battery 12.

In an embodiment, the first battery 12 and the m-th battery 12 of the battery module 10 at least satisfy: the capacity of the m-th battery 12 is greater than that of the first battery 12.

In an embodiment, the first battery 12 and the m-th battery 12 of the battery module at least satisfy: under a same state of charge, an AC impedance of the m-th battery 12 is less than that of the first battery 12.

In an embodiment, when n is an odd, m=(n+1)/2, when n is an even, m=n/2. For example, when n=3, n/2 is 1.5, rounded to an integer to obtain m=2. When n=4, n/2 is 2, m=2. When n=5, n/2 is 2.5, rounded to an integer to obtain m=3. When n=10, n/2 is 5, m=5.

That is, by making the battery 12 at least at both ends of the battery module 10 and at least one battery 12 in the middle of the battery module 10 satisfy at least one of the above conditions, the batteries 12 with different stacking positions in the battery module 10 have different initial states according to the above rule, so that the plurality of stacked batteries 12 have better consistency in a subsequent charge and discharge process.

A method for testing a battery capacity in the present application is that: a battery is charged to a voltage of 4.35V with a constant current of 0.2 C, then charged to a current of 0.05 C with a constant voltage of 4.35V, and then discharged to a voltage of 2.8V with a constant current of 0.2 C, and the battery capacity is recorded.

A method for testing an open circuit voltage in the present application is: measuring an open circuit voltage of a battery with a voltage instrument under a same SOC (State of Charge).

A method for testing an AC impedance is that: at 25° C., a battery 12 is charged to a same SOC, and then placed on an AC impedance test instrument to test an internal resistance, and a frequency used in the test is 1000 Hz.

In an embodiment, the SOC is 25% to 80%. The SOC of the battery 12 can be adjusted to different levels according to the actual needs to meet the needs of different service conditions. The AC impedance of the battery 12 is less than or equal to 20 mΩ. The AC impedance of the battery 12 has good rate capability in this range. When working under large rate conditions, the arrangement mode of battery modules in the present application has better effect.

The battery 12 may include a housing 13, and the housing 13 is a soft package or a hard shell. Thereinto, the hard shell can be plastic shell and metal shell, and the soft package can be aluminum plastic film packaging bag, etc. The housing 13 is wrapped outside the battery 12, and the housings 13 of adjacent batteries 12 can be bonded by adhesive or clamped by external fastening devices such as ties, so as to realize the stacking arrangement between the plurality of batteries 12. In an embodiment, a buffer may be provided between adjacent batteries 12.

In an embodiment, p is defined as a round number of m/2, n≥5, and the first battery 12, the p-th battery 12 and the m-th battery 12 satisfy at least one of the following conditions: a2: a capacity of the p-th battery 12 is greater than that of the first battery 12, and less than that of the m-th battery 12, b2: under a same state of charge, an open circuit voltage of the p-th battery 12 is less than that of the first battery 12, and greater than that of the m-th battery 12, and c2: under a same state of charge, an AC impedance of the p-th battery 12 is less than that of the first battery 12, and greater than that of the m-th battery 12.

Thereinto, the p-th battery 12 can be understood as the battery 12 in the middle of the arrangement from the first battery 12 to the m-th battery 12. Correspondingly, when m/2 is a non-integer, p is an integer obtained by rounding m/2.

By making a plurality of batteries 12 between at least one battery 12 in the middle of the battery module 10 and at least one battery 12 at both ends of the battery module 10 satisfy at least one of the above conditions, the batteries 12 with different stacking positions in the battery module 10 have different initial states according to the above rule, so that the plurality of stacked batteries 12 have better consistency in a subsequent charge and discharge process. That is, among the stacked m batteries 12, at least two batteries 12 at both ends, the m-th battery 12 in the middle, and the p-th battery 12 between the m-th battery 12 and the two batteries 12 at both ends are arranged in a regular gradient.

In an embodiment, the first battery 12 to the m-th battery 12 satisfy at least one of the following conditions: a3: a capacity of the battery close to the m-th battery 12 is greater than that of the battery away from the m-th battery 12, b3: under a same state of charge, an open circuit voltage of the battery close to the m-th battery 12 is less than that of the battery away from the m-th battery 12, and c3: under a same state of charge, an AC impedance of the battery close to the m-th battery 12 is less than that of the battery away from the m-th battery 12.

The plurality of stacked batteries 12 from the first battery 12 to the m-th battery 12 are stacked in at least one of the above conditions, so that the batteries 12 with different stacking positions in the battery module 10 have different initial states according to the above rules, which makes the plurality of stacked batteries 12 further have better consistency in the subsequent charging and discharging process. Through this gradient arrangement, the capacity of the stacked battery 12 in the middle of the battery module 10 is larger, and its voltage and AC impedance are lower, so that when the battery module 10 is charged and discharged, the discharge rate and heat production of the battery 12 in the middle are smaller, and its charging voltage is lower, and further, it is possible to significantly improve the problem of accelerating the performance degradation of the whole battery module due to the increase of internal battery temperature and over charge and over discharge.

Among the stacked n batteries 12, a plurality of batteries 12 with close consistency can be divided into one battery unit 11. The number of batteries 12 included in the battery unit 11 is s, s is an integer greater than 0, and the n batteries 12 should include at least three battery units 11, and the number of battery units 11 in the middle is at least one, that is, when s=2, n≥3, or when s=3, n≥7, or when s=4, n≥9.

Figure 3:
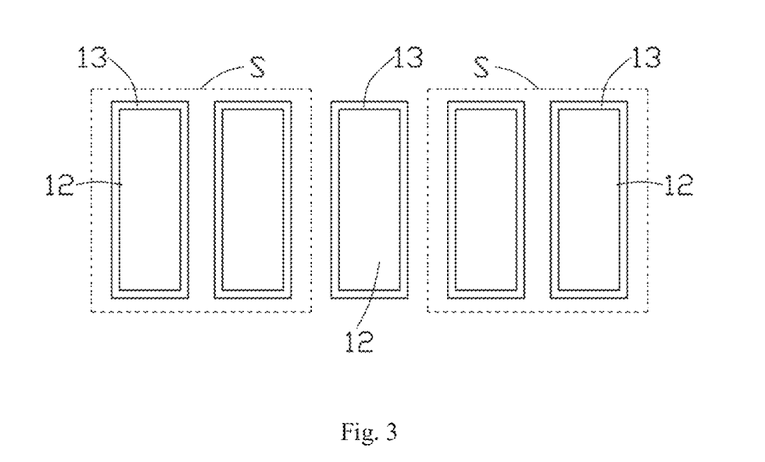
FIG. 3 is a grouping diagram of a battery module according to an embodiment of the present application.
Figure 4:
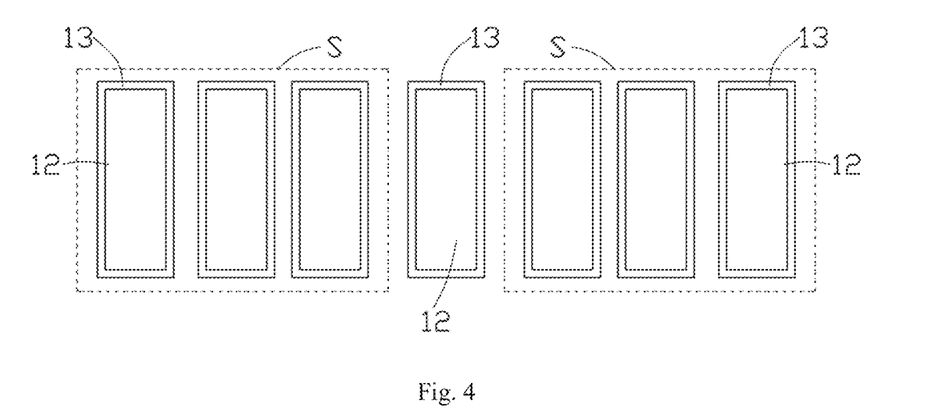
FIG. 4 is a grouping diagram of a battery module according to an embodiment of the present application.
Figure 5:
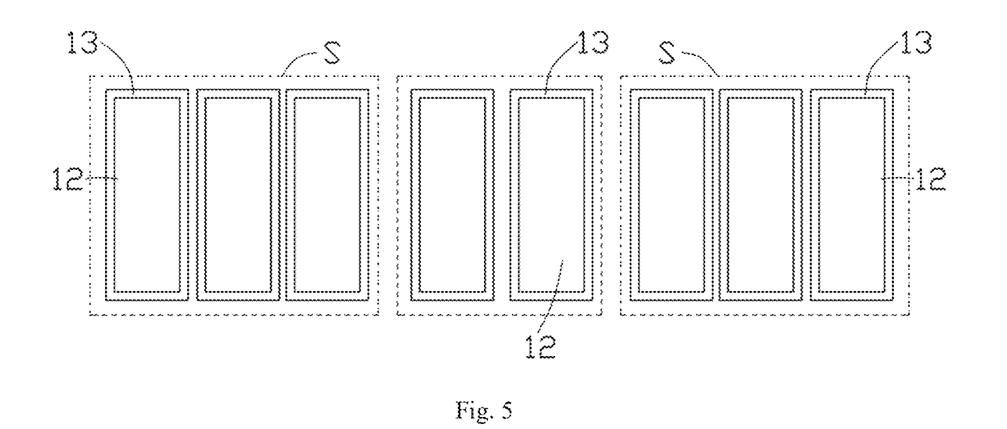
FIG. 5 is a grouping diagram of a battery module according to an embodiment of the present application.

As shown in FIGS. 3 to 5, they are schematic diagrams of the battery module 10 when the battery unit 11 is in different states.

In an embodiment, as shown in FIG. 3, the battery module 10 may include three battery units 11, and in the battery units 11 on both sides, it may be s=2, and in the battery units 11 in the middle, it may be s=1 (i.e., only including a single battery 12).

In an embodiment, as shown in FIG. 4, the battery module 10 may include three battery units 11, in the battery units 11 on both sides, it may be s=3, and in the battery units 11 in the middle, it may be s=1 (i.e., only including a single battery 12).

In an embodiment, as shown in FIG. 5, the battery module 10 may include three battery units 11, in the battery units 11 on both sides, it may be s=3, and in the battery units 11 in the middle, it may be s=2.

In other embodiments, values of s for the plurality of battery units 11 may be exactly the same, or not exactly the same, or completely different.

It can be understood that s batteries in one battery unit 11 have high consistency in at least one value of battery capacity, open circuit voltage and AC impedance, so as to improve the overall consistency of the battery module 10.

In an embodiment, in the first battery 12 to a s-th battery 12, a maximum capacity is $C_{max}$, a minimum capacity is $C_{min}$, $(C_{max}-C_{min})/C_{max} \leq 6\%$, wherein when s=2, n≥3; or when s=3, n≥7; or when s=4, n≥9. By controlling the capacity of the first battery 12 to the s-th battery 12 to fluctuate in a small range, the overall consistency of the battery module 10 is further improved.

In an embodiment, under a same state of charge, in the first battery 12 to a s-th battery 12, a maximum open circuit voltage is $V_{max}$, a minimum open circuit voltage is $V_{min}$, $V_{max}-V_{min} \leq 10$ mV, wherein when s=2, n≥3, or when s=3, n≥7, or when s=4, n≥9. By controlling the open circuit voltage of the first battery 12 to the s-th battery 12 to fluctuate in a small range, the overall consistency of the battery module 10 is further improved.

In an embodiment, under a same state of charge, in the first battery 12 to a s-th battery, a maximum AC impedance is $R_{max}$, a minimum AC impedance is $R_{min}$, $(R_{max}-R_{min})/R_{max} \leq 25\%$, wherein when s=2, n≥3, or when s=3, n≥7, or when s=4, n≥9. By controlling the AC impedance of the first battery 12 to the s-th battery 12 to fluctuate in a small range, the overall consistency of the battery module 10 is further improved.

The present application further provides an electronic device 1, including the above-mentioned battery module 10.

Figure 10:
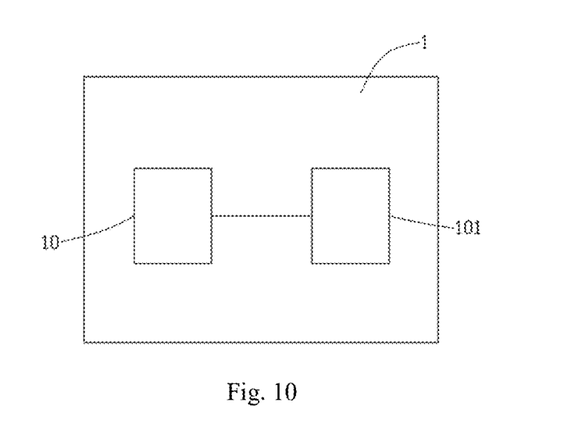
FIG. 10 is a schematic diagram of an electric device according to an embodiment of the present application.

In an embodiment, the electronic device 1 includes a plurality of battery modules 10 arranged in a direction perpendicular to the thickness direction X of the battery 12, and the plurality of battery modules 10 are connected in series or in parallel.

As shown in FIG. 10, it is a schematic diagram of an electronic device 1 according to an embodiment of the present application. Another embodiment of the present application further provides an electronic device 1, and the electronic device 1 includes a battery module 10 and a load 101, and the battery module 10 is configured to supply power to the load 101. The electronic device 1 of the present application is not particularly limited, but can be used for any electronic device known in the prior art.

In some embodiments, the electronic device 1 may include, but is not limited to, a notebook computer, a pen input computer, a mobile computer, an e-book player, a portable communication device, a portable copier, a portable printer, a standby power supply, a motor, an automobile, a motorcycle, an electric bicycle, a lighting fixture, a toy, an electric tool, a large battery for household use and a lithium-ion capacitor.

Figure 11:
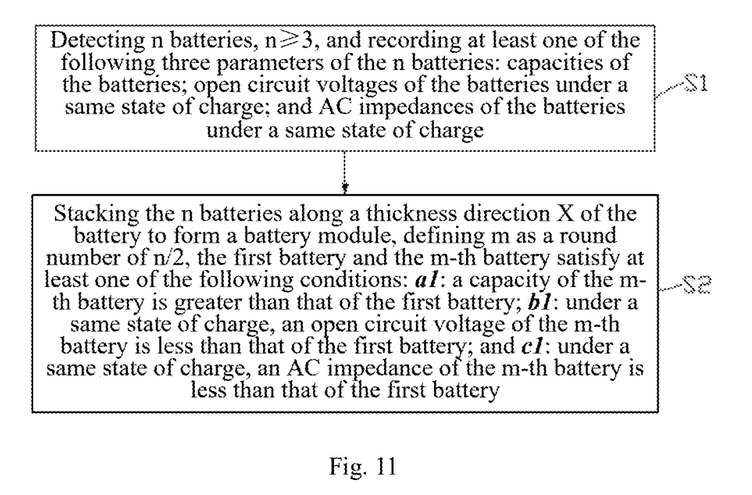
FIG. 11 is a flow diagram of an assembly method of a battery module according to an embodiment of the present application.

As shown in FIG. 11, an embodiment of the present application further provides an assembly method of a battery module 10, including the following steps:

step S1: detecting n batteries 12, n≥3, and recording at least one of the following three parameters of the n batteries 12: capacities of the batteries 12, open circuit voltages of the batteries 12 under a same state of charge, and AC impedances of the batteries 12 under a same state of charge.

Step S2: stacking the n batteries 12 along the thickness direction X of the battery 12 to form a battery module 10, defining m as a round number of n/2, wherein the first battery 12 and the m-th battery 12 satisfy at least one of the following conditions.

a1: a capacity of the m-th battery 12 is greater than that of the first battery 12, b1: under a same state of charge, an open circuit voltage of the m-th battery 12 is less than that of the first battery 12, and c1: under a same state of charge, an AC impedance of the m-th battery 12 is less than that of the first battery 12.

Figure 12:
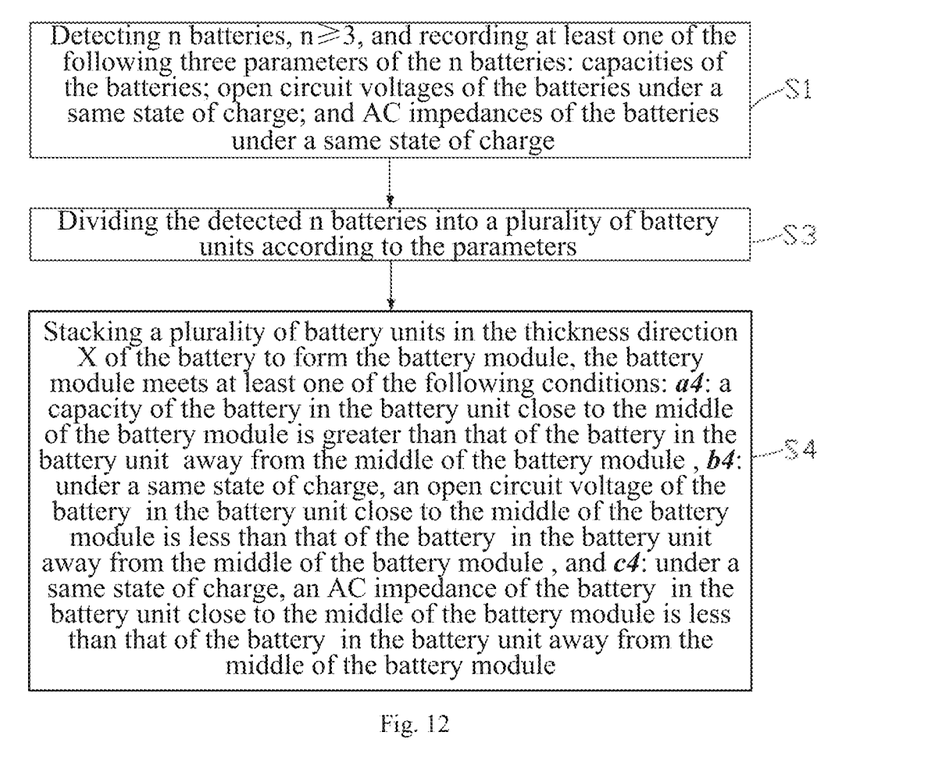
FIG. 12 is a flow diagram of another assembly method of a battery module according to an embodiment of the present application.

In an embodiment, as shown in FIG. 12, an embodiment of the present application can further provide another assembly method of the battery module 10, including the following steps:

step S1: detecting n batteries 12, n≥3, and recording at least one of the following three parameters of the n batteries 12: capacities of the batteries 12, open circuit voltages of the batteries 12 under a same state of charge, and AC impedances of the batteries 12 under a same state of charge.

Step S3: dividing the detected n batteries 12 into a plurality of battery units 11 according to the parameters.

Step S4: stacking a plurality of battery units 11 in the thickness direction X of the battery 12 to form the battery module 10, wherein the battery module 10 satisfy at least one of the following conditions.

a4: a capacity of the battery 12 in the battery unit 11 close to the middle of the battery module 10 is greater than that of the battery 12 in the battery unit 11 away from the middle of the battery module 10, b4: under a same state of charge, an open circuit voltage of the battery 12 in the battery unit 11 close to the middle of the battery module 10 is less than that of the battery 12 in the battery unit 11 away from the middle of the battery module 10, and c4: under a same state of charge, an AC impedance of the battery 12 in the battery unit 11 close to the middle of the battery module 10 is less than that of the battery 12 in the battery unit 11 away from the middle of the battery module 10.

As shown in FIGS. 6 to 9, they are grouping diagrams of different battery units 11, and thereinto, each battery unit 11 includes a plurality of batteries 12.

In an embodiment, a filling line in the battery 12 can represent an approximate capacity proportion of the battery.

Figure 6:
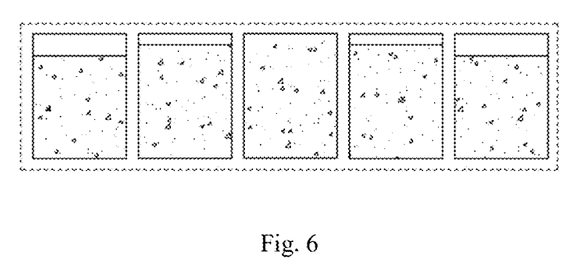
FIG. 6 is a grouping diagram of a battery unit according to an embodiment of the present application.

In an embodiment, as shown in FIG. 6, the maximum difference between the capacities of the battery 12 at the end and the battery 12 at the middle satisfies $(C_{max}-C_{min})/C_{max} \leq 6\%$, and the maximum difference between the capacities of any two adjacent batteries 12 satisfies $(C_{max}-C_{min})/C_{max} < 6\%$. The capacities of the batteries 12 may gradually increase from one side to the middle of the battery unit 11, and then gradually decrease from the middle to the other side of the battery unit 11. The capacity change between the adjacent multiple batteries 12 may be an arithmetic change, a geometric change, or a non-arithmetic and non-geometric change.

Figure 7:
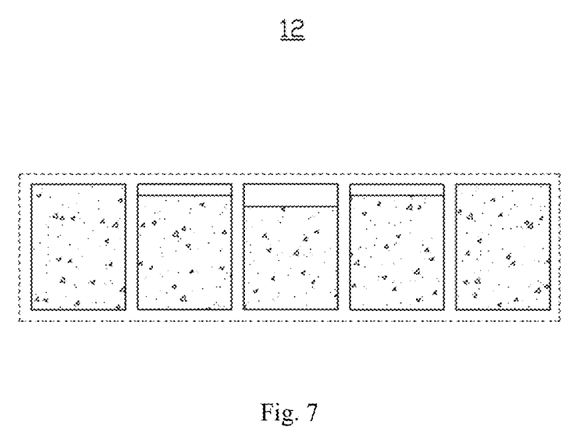
FIG. 7 is a grouping diagram of a battery unit according to an embodiment of the present application.

In an embodiment, as shown in FIG. 7, the maximum difference between the capacities of the battery 12 at the end and the battery 12 at the middle satisfies $(C_{max}-C_{min})/C_{max} \leq 6\%$, and the maximum difference between the capacities of any two adjacent batteries 12 satisfies $(C_{max}-C_{min})/C_{max} < 6\%$. The capacities of the batteries 12 may gradually decrease from one side to the middle of the battery unit 11, and then gradually increase from the middle to the other side of the battery unit 11. The capacity change between the adjacent multiple batteries 12 may be an arithmetic change, a geometric change, or a non-arithmetic and non-geometric change.

Figure 8:
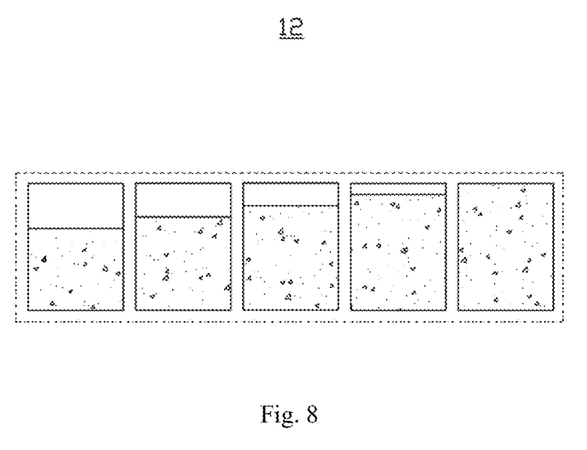
FIG. 8 is a grouping diagram of a battery unit according to an embodiment of the present application.

In an embodiment, as shown in FIG. 8, the maximum difference between the capacities of the two batteries 12 at the ends satisfies $(C_{max}-C_{min})/C_{max} \leq 6\%$, and the maximum difference between the capacities of any two adjacent batteries 12 satisfies $(C_{max}-C_{min})/C_{max} < 6\%$. The capacities of the batteries 12 may gradually decrease from one side to the other side of the battery unit 11, and the capacity change between the adjacent multiple batteries 12 may be an arithmetic change, a geometric change, or a non-arithmetic and non-geometric change.

Figure 9:
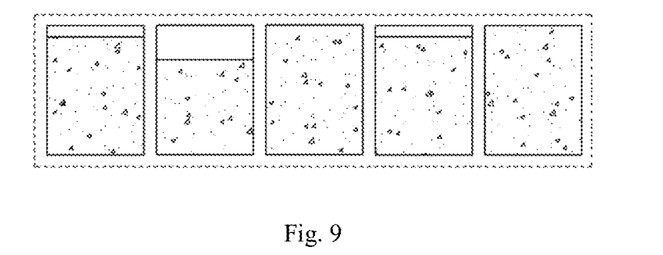
FIG. 9 is a grouping diagram of a battery unit according to an embodiment of the present application.

In an embodiment, as shown in FIG. 9, the maximum difference between the capacities of the adjacent batteries 12 satisfies $(C_{max}-C_{min})/C_{max} \leq 6\%$, but the arrangement order is not limited, and the capacity change between the adjacent multiple batteries 12 may be an arithmetic change, a geometric change, or a non-arithmetic and non-geometric change.

In an embodiment, the filling line in the battery 12 can also represent an approximate open circuit voltage ratio of the battery under the same state of charge.

In an embodiment, as shown in FIG. 6, the maximum difference between the open circuit voltages of the battery 12 at the end and the battery 12 at the middle satisfies $V_{max}-V_{min} \leq 10$ mV, and the maximum difference between the open circuit voltages of any two adjacent batteries 12 satisfies $V_{max}-V_{min} < 10$ mV. The open circuit voltages of the batteries 12 may gradually increase from one side to the middle of the battery unit 11, and then gradually decrease from the middle to the other side of the battery unit 11. The open circuit voltage change between the adjacent multiple batteries 12 may be an arithmetic change, a geometric change, or a non-arithmetic and non-geometric change.

In an embodiment, as shown in FIG. 7, the maximum difference between the open circuit voltages of the battery 12 at the end and the battery 12 at the middle satisfies $V_{max}-V_{min} \leq 10$ mV, and the maximum difference between the open circuit voltages of any two adjacent batteries 12 satisfies $V_{max}-V_{min} < 10$ mV. The open circuit voltages of the batteries 12 may gradually decrease from one side to the middle of the battery unit 11, and then gradually increase from the middle to the other side of the battery unit 11. The open circuit voltage change between the adjacent multiple batteries 12 may be an arithmetic change, a geometric change, or a non-arithmetic and non-geometric change.

In an embodiment, as shown in FIG. 8, the maximum difference between the open circuit voltages of the two batteries 12 at the ends satisfies $V_{max}-V_{min} \leq 10$ mV, and the maximum difference between the open circuit voltages of any two adjacent batteries 12 satisfies $V_{max}-V_{min} < 10$ mV. The open circuit voltages of the batteries 12 may gradually increase from one side to the other side of the battery unit 11. The open circuit voltage change between the adjacent multiple batteries 12 may be an arithmetic change, a geometric change, or a non-arithmetic and non-geometric change.

In an embodiment, as shown in FIG. 9, the maximum difference between the open circuit voltages of the adjacent batteries 12 satisfies $V_{max}-V_{min} \leq 10$ mV, but the arrangement order is not limited, and the open circuit voltage change between the adjacent multiple batteries 12 may be an arithmetic change, a geometric change, or a non-arithmetic and non-geometric change.

In an embodiment, the filling line in the battery 12 can also represent an approximate AC impedance ratio of the battery under the same state of charge.

In an embodiment, as shown in FIG. 6, the maximum difference between the AC impedances of the battery 12 at the end and the battery 12 at the middle satisfies $(R_{max}-$ $R_{min})/R_{max} \leq 25\%$, and the maximum difference between the AC impedances of any two adjacent batteries 12 satisfies $(R_{max}-R_{min})/R_{max}<25\%$. The AC impedances of the batteries 12 may gradually increase from one side to the middle of the battery unit 11, and then gradually decrease from the middle to the other side of the battery unit 11. The AC impedance change between the adjacent multiple batteries 12 may be an arithmetic change, a geometric change, or a non-arithmetic and non-geometric change.

In an embodiment, as shown in FIG. 7, the maximum difference between the AC impedances of the battery 12 at the end and the battery 12 at the middle satisfies $(R_{max}-R_{min})/R_{max} \leq 25\%$, and the maximum difference between the AC impedances of any adjacent batteries 12 satisfies $(R_{max}-R_{min})/R_{max}<25\%$. The AC impedances of the batteries 12 may gradually decrease from one side to the middle of the battery unit 11, and then gradually increase from the middle to the other side of the battery unit 11. The AC impedance change between the adjacent multiple batteries 12 may be an arithmetic change, a geometric change, or a non-arithmetic and non-geometric change.

In an embodiment, as shown in FIG. 8, the maximum difference between the AC impedances of the two batteries 12 at the ends satisfies $(R_{max}-R_{min})/R_{max} \leq 25\%$, and the maximum difference between the AC impedances of any two adjacent batteries 12 satisfies $(R_{max}-R_{min})/R_{max}<25\%$. The AC impedances of the batteries 12 may gradually increase from one side to the other side of the battery unit 11. The AC impedance change between the adjacent multiple batteries 12 may be an arithmetic change, a geometric change, or a non-arithmetic and non-geometric change.

In an embodiment, as shown in FIG. 9, the maximum difference between the AC impedances of the adjacent batteries 12 satisfies $(R_{max}-R_{min})/R_{max} \leq 25\%$, but the arrangement order is not limited, and the AC impedance change between the adjacent multiple batteries 12 may be an arithmetic change, a geometric change, or a non-arithmetic and non-geometric change.

In a process of assembling the battery module 10, before assembling the plurality of batteries 12, the plurality of batteries 12 are detected and grouped, so that a plurality of (e.g. S) batteries 12 in which at least one value of capacities, open circuit voltages or AC impedances are close (that is, consistency is relatively close) are divided into one battery unit 11, and further, the consistency of the batteries 12 in the plurality of battery units 11 in the battery module 10 is improved.

Specific embodiments and Comparative examples (in a X-series-and-Y-parallel battery module composed of batteries mentioned below, X indicates that X batteries are connected in series to obtain a battery unit, and Y indicates that Y identical battery units are connected in parallel. It should be understood that the battery unit composed in this way can be regarded as a module, and small battery units can be further divided in the battery unit) are follow:

Comparative Example 1

A same batch of batteries is selected and their open circuit voltages are tested under the same state of charge. A range of their open circuit voltages is 3.50V~3.65V. The selected batteries are assembled into 36 6-series-and-1-parallel battery units, and each battery is stacked along the thickness direction. The open circuit voltage of the battery in the middle of each battery unit has a maximum value of the range, and the open circuit voltage of the battery at the end of each battery unit has a minimum value of the range.

Comparative Example 2

A same batch of batteries is selected and their capacities are tested. A range of their capacities is 19.4 Ah~20.95 Ah. The selected batteries are assembled into 36 6-series-and-1-parallel battery units, and each battery is stacked along the thickness direction. The capacity of the battery in the middle of each battery unit has a minimum value of the range, and the capacity of the battery at the end of each battery unit has a maximum value of the range.

Comparative Example 3

A same batch of batteries is selected and their AC impedances are tested under the same state of charge. A range of their AC impedances is 17.0 mΩ~22.0 mΩ. The selected batteries are assembled into 36 6-series-and-1-parallel battery units, and each battery is stacked along the thickness direction. The AC impedance of the battery in the middle of each battery unit has a maximum value of the range, and the AC impedance of the battery at the end of each battery unit has a minimum value of the range.

Embodiment 1

A same batch of batteries is selected and their open circuit voltages are tested under the same state of charge. A range of their open circuit voltages is 3.50V~3.65V. The selected batteries are assembled into 36 6-series-and-1-parallel battery units, and each battery is stacked along the thickness direction. The open circuit voltage of the battery in the middle of each battery unit has a minimum value of the range, and the open circuit voltage of the battery at the end of each battery unit has a maximum value of the range.

Embodiment 2

A same batch of batteries is selected and their open circuit voltages are tested under the same state of charge. A range of their open circuit voltages is 3.50V~3.65V. Furthermore, multiple batteries are divided into two groups according to the range of their open circuit voltages, that is, [3.50, 3.60], (3.60, 3.58]. The batteries are selected from batteries having open circuit voltages in the range of [3.50, 3.60], and are assembled into 36 6-series-and-1-parallel battery units, and each battery is stacked along the thickness direction. The open circuit voltage of the battery in the middle of each battery unit has a minimum value of the respective range, and the open circuit voltage of the battery at the end of each battery unit has a maximum value of the respective range.

Embodiment 3

A same batch of batteries is selected and their open circuit voltages are tested under the same state of charge. A range of their open circuit voltages is 3.50V~3.58V. Furthermore, multiple batteries are divided into two groups according to the range of open circuit voltages, that is, [3.50, 3.55], (3.55, 3.58]. The batteries are selected from batteries having open circuit voltages in the range of [3.50, 3.55], and are assembled into 36 6-series-and-1-parallel battery units, and each battery is stacked along the thickness direction. The open circuit voltage of the battery in the middle of each battery unit has a minimum value of the respective range, and the open circuit voltage of the battery at the end of each battery unit has a maximum value of the respective range.

Embodiment 4

A same batch of batteries is selected and the open circuit voltages are tested under the same state of charge. A range of their open circuit voltages is 3.50V~3.65V. Furthermore, multiple batteries are divided into two groups according to the range of open circuit voltages, that is, [3.50, 3.60], (3.60, 3.58]. The batteries are selected from batteries having open circuit voltages in the range of [3.50, 3.60], and are assembled into 36 6-series-and-1-parallel battery units, and each battery is stacked along the thickness direction. The open circuit voltage of the battery in the middle of each battery unit has a minimum value of the respective range, the open circuit voltage of the battery at the end of each battery unit has a maximum value of the respective range, and the open circuit voltages successively decrease from the end to the middle.

Embodiment 5

A same batch of batteries is selected and their capacities are tested. A range of their capacities is 19.4 Ah~20.95 Ah. The 36 groups of batteries are selected and assembled into 36 6-series-and-1-parallel battery units, and each battery is stacked along the thickness direction. The capacity of the battery in the middle of each battery unit has a maximum value of the range, and the capacity of the battery at the end of each battery unit has a minimum value of the range.

Embodiment 6

A same batch of batteries is selected and their capacities are tested. A range of their capacities is 19.4 Ah~20.95 Ah. Furthermore, multiple batteries are divided into two groups according to the range of capacities, that is, [19.4, 20.56], (20.56, 20.95]. The 36 groups of batteries are selected from the group whose battery capacity range is [19.4, 20.56], and are assembled into 36 6-series-and-1-parallel battery units, and each battery is stacked along the thickness direction. The capacity of the battery in the middle of each battery unit has a maximum value of the range, and the capacity of the battery at the end of each battery unit has a minimum value of the range.

Embodiment 7

A same batch of batteries is selected and their capacities are tested. A range of their capacities is 19.4 Ah~20.95 Ah. Furthermore, multiple batteries are divided into two groups according to the range of capacities, that is, [19.4, 20.56), [20.56, 20.95]. The 36 groups of batteries are selected from the group whose battery capacity range is [20.56, 20.95], and are assembled into 36 6-series-and-1-parallel battery units, and each battery is stacked along the thickness direction. The capacity of the battery in the middle of each battery unit has a maximum value of the range, and the capacity of the battery at the end of each battery unit has a minimum value of the range.

Embodiment 8

A same batch of batteries is selected and their capacities are tested. A range of their capacities is 19.4 Ah~20.95 Ah. Furthermore, multiple batteries are divided into two groups according to the range of capacities, that is, [19.4, 20.18], (20.18, 21.34]. The 36 groups of batteries are selected from batteries having a capacity range of [19.4, 20.18] are assembled into 6-series-and-1-parallel battery units, and each battery is stacked along the thickness direction. The capacity of the battery in the middle of each battery unit has a maximum value of the range, and the capacity of the battery at the end of each battery unit has a minimum value of the range.

Embodiment 9

A same batch of batteries is selected and their capacities are tested. A range of their capacities is 19.4 Ah~20.95 Ah. Furthermore, multiple batteries are divided into two groups according to the range of capacities, that is, [19.4, 20.56], (20.56, 20.95]. The 36 groups of batteries are selected from the group whose battery capacity range is [19.4, 20.56], and are assembled into 6-series-and-1-parallel battery units, and each battery is stacked along the thickness direction. The capacity of the battery in the middle of each battery unit has a maximum value of the range, and the capacity of the battery at the end of each battery unit has a minimum value of the range, and the capacities successively increase from the end to the middle.

Embodiment 10

A same batch of batteries is selected and their AC impedances are tested under the same state of charge. A range of their AC impedances is 17.0 mΩ~22.0 mΩ. The 36 groups of batteries are selected and assembled into 36 6-series-and-1-parallel battery units, and each battery is stacked along the thickness direction. The AC impedance of the battery in the middle of each battery unit has a minimum value of the range, and the AC impedance of the battery at the end of each battery unit has a maximum value of the range.

Embodiment 11

A same batch of batteries is selected and their AC impedances are tested under the same state of charge. A range of their AC impedances is 17.0 mΩ~22.0 mΩ. Furthermore, the batteries are divided into two groups according to the range of AC impedances, that is, [17.0, 21.25], (21.25, 22.0]. The 36 groups of batteries are selected from batteries having an AC impedance range of [17.0, 21.25], and are assembled into 36 6-series-and-1-parallel battery units, and each battery is stacked along the thickness direction. The AC impedance of the battery in the middle of each battery unit has a minimum value of the range, and the AC impedance of the battery at the end of each battery unit has a maximum value of the range.

Embodiment 12

A same batch of batteries is selected and their AC impedances are tested under the same state of charge. A range of their AC impedances is 17.0 mΩ~22.0 mΩ. Furthermore, the batteries are divided into two groups according to the range of AC impedances, that is, [17.0, 20.4], (20.4, 22.0]. The 36 groups of batteries are selected from batteries having an AC impedance range of [17.0, 20.4], and are assembled into 36 6-series-and-1-parallel battery units, and each battery is stacked along the thickness direction. The AC impedance of the battery in the middle of each battery unit has a minimum value of the range, and the AC impedance of the battery at the end of each battery unit has a maximum value of the range.

Embodiment 13

A same batch of batteries is selected and their AC impedances are tested under the same state of charge. A range of their AC impedances is 17.0 mΩ~22.0 mΩ. Furthermore, the batteries are divided into two groups according to the range of AC impedances, that is, [17.0, 19.55], (19.55, 22.0]. The 36 groups of batteries are selected from batteries having an AC impedance range of [17.0, 19.55], and are assembled into 36 6-series-and-1-parallel battery units, and each battery is stacked along the thickness direction. The AC impedance of the battery in the middle of each battery unit has a minimum value of the range, and the AC impedance of the battery at the end of each battery unit has a maximum value of the range.

Embodiment 14

A same batch of batteries is selected and their AC impedances are tested under the same state of charge. A range of their AC impedances is 17.0 mΩ~22.0 mΩ. Furthermore, the batteries are divided into two groups according to the range of AC impedances, that is, [17.0, 19.55), [19.55, 22.0]. The 36 groups of batteries are selected from batteries having an AC impedance range of [19.55, 22.0], and are assembled into 36 6-series-and-1-parallel battery units, and each battery is stacked along the thickness direction. The AC impedance of the battery in the middle of each battery unit has a minimum value of the range, and the AC impedance of the battery at the end of each battery unit has a maximum value of the range.

the batteries are divided into two groups according to the range of AC impedances, that is, [17.0, 21.25], (21.25, 22.0]. The 36 groups of batteries are selected from batteries having an AC impedance range of [17.0, 21.25], and are assembled into 36 6-series-and-1-parallel battery units, and each battery is stacked along the thickness direction. The AC impedance of the battery in the middle of each battery unit has a minimum value of the range, and the AC impedance of the battery at the end of each battery unit has a maximum value of the range, and the AC impedance decreases from the end to the middle.

The maximum differences of open circuit voltage, change rates of capacity and AC impedance of the battery in each battery unit are recorded.

Maximum difference of open circuit voltage=maximum voltage−minimum voltage.

Maximum difference rate of capacity=(maximum capacity−minimum capacity)/minimum capacity.

Maximum difference rate of AC resistance=(maximum AC impedance−minimum AC impedance)/minimum AC impedance.

Charge and discharge test is: performing a cycle test of a 40 A-charge and 160 A-discharge on the battery units of the above comparative examples and embodiments respectively, and recording a maximum difference range of the working temperature in the middle of the battery during the first five cycles of each battery unit and a cycle capacity retention ratio (ratio of discharge capacity to charging capacity) when the battery in each battery unit is cycled to the 600th cycle.

Data in the above embodiments and comparative examples are shown in Table 1 hereinafter:

TABLE 1

| | Maximum difference of open circuit voltage/mV | Maximum difference rate of capacity range rate/% | Maximum difference rate of AC resistance range rate/% | Cycle temperature difference range in the middle/° C. | 600th-cycle retention ratio/% |
| --- | --- | --- | --- | --- | --- |
| Comparative Example 1 | 15 | / | / | 8~10 | 70~83 |
| Comparative Example 2 | / | 8 | / | 8~11 | 71~83 |
| Comparative Example 3 | / | / | 29.5 | 8~10 | 70~82 |
| Embodiment 1 | 15 | / | / | 5~7 | 75~85 |
| Embodiment 2 | 10 | / | / | 5~6 | 80~85 |
| Embodiment 3 | 5 | / | / | 4.5~5 | 83~85 |
| Embodiment 4 | 10 | / | / | 5~5.5 | 83~85 |
| Embodiment 5 | / | 8 | / | 7~9 | 75~83 |
| Embodiment 6 | / | 6 | / | 6~7.5 | 80~85 |
| Embodiment 7 | / | 1.9 | / | 4.5~5 | 85 |
| Embodiment 8 | / | 4 | / | 5~6 | 82~84 |
| Embodiment 9 | / | 6 | / | 6~7 | 82~84 |
| Embodiment 10 | / | / | 29.5 | 6~9 | 75~83 |
| Embodiment 11 | / | / | 25 | 6~7 | 78~84 |
| Embodiment 12 | / | / | 20 | 5.5~6.5 | 80~84 |
| Embodiment 13 | / | / | 15 | 5.5~5 | 83~85 |
| Embodiment 14 | / | / | 12.5 | 5.5~6 | 82~84 |
| Embodiment 15 | / | / | 25 | 5.5~6.5 | 82~84 |

"/" in the above table indicates that this parameter is not controlled.

Embodiment 15

A same batch of batteries is selected and their AC impedances are tested under the same state of charge. A range of their AC impedances is 17.0 mΩ~22.0 mΩ. Furthermore, Comparing Embodiments 1 to 4 and Comparative Example 1, it can be seen that when stacking batteries along the thickness direction, placing the battery with smaller open circuit voltage in the middle of the battery unit and the battery with larger open circuit voltage at the end of the battery unit can reduce the temperature rise in the middle of the battery, improve the cycle retention ratio, reduce the fluctuation range of temperature and cycle retention ratio in the middle of the battery and improve the consistency of the battery unit.

Comparing Embodiments 1 to 4, it can be seen that when the open circuit voltage range of the battery unit is controlled below 10 mV, the temperature rise can be further reduced, the cycle retention ratio can be improved, and the improvement effect of the consistency of the battery unit is more significant.

Comparing Embodiments 2 and 4, it can be seen that when the open circuit voltage of the batteries in the battery unit decreases successively from the end to the middle, the improvement effect of the consistency of the battery unit is more significant.

Comparing Embodiments 5-9 and Comparative Example 2, it can be seen that when stacking batteries along the thickness direction, placing the battery with large capacity in the middle of the battery unit and the battery with small capacity at the end of the battery unit can reduce the temperature rise in the middle of the battery, improve the cycle retention ratio, reduce the fluctuation range of temperature and cycle retention ratio in the middle of the battery and improve the consistency of the battery unit.

Comparing Embodiments 5-9, it can be seen that when the maximum difference rate of the capacity range rate of the battery unit is controlled below 6%, the temperature rise can be further reduced, the cycle retention ratio can be improved, and the improvement effect of the consistency of the battery unit is more significant.

Comparing Embodiments 6 and 9, it can be seen that when the capacity of the batteries in the battery unit increases successively from the end to the middle, the improvement effect of the consistency of the battery unit is more significant.

Comparing Embodiments 10-15 and Comparative Example 3, it can be seen that when stacking batteries along the thickness direction, placing the battery with large AC impedance in the middle of the battery unit and the battery with small AC impedance at the end of the battery unit can reduce the temperature rise in the middle of the battery, improve the cycle retention ratio, reduce the fluctuation range of temperature and cycle retention ratio in the middle of the battery and improve the consistency of the battery unit.

Comparing Embodiments 10-15, it can be seen that when the maximum difference rate of the AC impedance range rate of the battery unit is controlled below 25%, the temperature rise can be further reduced, the cycle retention ratio can be improved, and the improvement effect of the consistency of the battery unit is more significant.

Comparing Embodiments 11 and 15, it can be seen that when the AC impedance of the batteries in the battery unit decreases successively from the end to the middle, the improvement effect of the consistency of the battery unit is more significant.

Comparing Embodiments 13 and 14, it can be seen that when the AC impedance of the battery in the battery unit is controlled below 20 mΩ, the improvement effect of battery unit consistency is more significant.

Comparing Embodiments 1-15, it can be seen that when the open circuit voltage of the battery in the battery unit is controlled to satisfy a certain condition, the improvement effect of the battery unit consistency is more significant.

As mentioned above, specific embodiments of the present application are described with reference to the accompanying drawings. However, those skilled in the art can understand that various changes and substitutions can be made to the specific embodiments of the present application without departing from the scope of the present application. These changes and replacements fall within the scope of the present application.

What is claimed is:

1. A battery module, comprising n batteries, n≥3, the n batteries being stacked in a sequence along a thickness direction of the battery from a first battery to an n-th battery, wherein
   m is defined as a round number of n/2, and the first battery and the m-th battery satisfy at least one of the following conditions:
   a1: a capacity of the m-th battery is greater than that of the first battery and the n-th battery;
   b1: under a same state of charge, an open circuit voltage of the m-th battery is less than that of the first battery and the n-th battery; and
   c1: under a same state of charge, an AC impedance of the m-th battery is less than that of the first battery and the n-th battery.

2. The battery module according to claim 1, wherein under the same state of charge, the open circuit voltage of the m-th battery is less than that of the first battery.

3. The battery module according to claim 2, wherein the capacity of the m-th battery is greater than that of the first battery.

4. The battery module according to claim 1, wherein p is defined as a round number of m/2, n≥5, and the first battery, the p-th battery and the m-th battery satisfy at least one of the following conditions:
   a2: a capacity of the p-th battery is greater than that of the first battery, and less than that of the m-th battery;
   b2: under a same state of charge, an open circuit voltage of the p-th battery is less than that of the first battery, and greater than that of the m-th battery; and
   c2: under a same state of charge, an AC impedance of the p-th battery is less than that of the first battery, and greater than that of the m-th battery.

5. The battery module according to claim 1, wherein the first battery to the m-th battery satisfy at least one of the following conditions:
   a3: a capacity of the first battery is greater than that of a second battery, the first battery being closer to the m-th battery than the second battery;
   b3: under a same state of charge, an open circuit voltage of a battery closer to the m-th battery is less than that of a battery farther away from the m-th battery; and
   c3: under a same state of charge, an AC impedance of a battery closer to the m-th battery is less than that of a battery farther away from the m-th battery.

6. The battery module according to claim 1, wherein in the first battery to a s-th battery, a maximum capacity is $C_{max}$, a minimum capacity is $C_{min}$, $(C_{max}-C_{min})/C_{max} \leq 6\%$,
   when s=2, n≥3; or
   when s=3, n≥7; or
   when s=4, n≥9.

7. The battery module according to claim 1, wherein under a same state of charge, in the first battery to a s-th battery, a maximum open circuit voltage is $V_{max}$, a minimum open circuit voltage is $V_{min}$, $V_{max}-V_{min} \leq 10$ mV,
   when s=2, n≥3; or
   when s=3, n≥7; or
   when s=4, n≥9.

8. The battery module according to claim 1, wherein under a same state of charge, in the first battery to a s-th battery, a maximum AC impedance is $R_{max}$, a minimum AC impedance is $R_{min}$, $(R_{max}-R_{min})/R_{max} \leq 25\%$, when s=2, n≥3; or when s=3, n≥7; or when s=4, n≥9.

9. The battery module according to claim 1, wherein the state of charge is 25% to 80%.

10. The battery module according to claim 1, wherein the AC impedance of each battery is less than or equal to 20 mΩ.

11. The battery module according to claim 1, wherein each battery includes a housing, and the housing is a soft package or a hard shell.

12. An electronic device, comprising a battery module, the battery module comprises n batteries, n≥3, the n batteries being stacked in a sequence along a thickness direction of the battery from a first battery to an n-th battery, wherein m is defined as a round number of n/2, and the first battery and the m-th battery satisfy at least one of the following conditions:

a1: a capacity of the m-th battery is greater than that of the first battery and the n-th battery;

b1: under a same state of charge, an open circuit voltage of the m-th battery is less than that of the first battery and the n-th battery; and c1: under a same state of charge, an AC impedance of the m-th battery is less than that of the first battery and the n-th battery.

13. The electronic device according to claim 12, wherein the electronic device comprises a plurality of battery modules arranged in a direction perpendicular to a thickness direction of the battery, and the plurality of battery modules are connected in series or in parallel.

14. The electronic device according to claim 12, wherein under the same state of charge, the open circuit voltage of the m-th battery is less than that of the first battery.

15. The electronic device according to claim 12, wherein the capacity of the m-th battery is greater than that of the first battery.

16. The electronic device according to claim 12, wherein p is defined as a round number of m/2, n≥5, and the first battery, the p-th battery and the m-th battery satisfy at least one of the following conditions:

a2: a capacity of the p-th battery is greater than that of the first battery, and less than that of the m-th battery;

b2: under a same state of charge, an open circuit voltage of the p-th battery is less than that of the first battery, and greater than that of the m-th battery; and c2: under a same state of charge, an AC impedance of the p-th battery is less than that of the first battery, and greater than that of the m-th battery.

17. The electronic device according to claim 12, wherein the state of charge is 25% to 80%.

18. The electronic device according to claim 12, wherein the AC impedance of each battery is less than or equal to 20 mΩ.

19. The electronic device according to claim 12, wherein each battery includes a housing, and the housing is a soft package or a hard shell.

20. An assembly method of a battery module, comprising the following steps:

step S1: detecting n batteries, n≥3, and recording at least one of the following three parameters of the n batteries: capacities of the batteries; open circuit voltages of the batteries under a same state of charge; and AC impedances of the batteries under a same state of charge; and step S2: stacking the n batteries along a thickness direction of the battery from a first battery to an n-th battery to form a battery module, defining m as a round number of n/2, wherein the first battery and the m-th battery satisfy at least one of the following conditions:

a1: a capacity of the m-th battery is greater than that of the first battery and the n-th battery;

b1: under a same state of charge, an open circuit voltage of the m-th battery is less than that of the first battery and the n-th battery; and c1: under a same state of charge, an AC impedance of the m-th battery is less than that of the first battery and the n-th battery.

* * * * *